United States Patent
Vidal et al.

(10) Patent No.: US 9,189,357 B2
(45) Date of Patent: Nov. 17, 2015

(54) GENERATING MACHINE STATE VERIFICATION USING NUMBER OF INSTALLED PACKAGE OBJECTS

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 817 days.

(21) Appl. No.: 12/787,164

(22) Filed: May 25, 2010

(65) Prior Publication Data

US 2011/0296390 A1 Dec. 1, 2011

(51) Int. Cl.
| | | |
|---|---|---|
| G06F 15/173 | (2006.01) | |
| G06F 15/177 | (2006.01) | |
| G06F 9/44 | (2006.01) | |
| G06F 11/00 | (2006.01) | |
| G06F 11/30 | (2006.01) | |
| H04L 12/24 | (2006.01) | |
| G06F 11/14 | (2006.01) | |
| G06F 9/445 | (2006.01) | |
| G06F 21/10 | (2013.01) | |
| G06F 21/57 | (2013.01) | |

(52) U.S. Cl.
CPC .............. *G06F 11/3051* (2013.01); *G06F 8/65* (2013.01); *G06F 11/1433* (2013.01); *G06F 11/302* (2013.01); *H04L 41/0869* (2013.01); *G06F 21/10* (2013.01); *G06F 21/57* (2013.01)

(58) Field of Classification Search
None
See application file for complete search history.

(56) References Cited

U.S. PATENT DOCUMENTS

| | | | |
|---|---|---|---|
| 6,711,557 B1 * | 3/2004 | Palaniappan | 706/45 |
| 6,990,660 B2 * | 1/2006 | Moshir et al. | 717/171 |
| 7,320,087 B2 * | 1/2008 | Sato et al. | 714/6.1 |
| 7,987,460 B2 * | 7/2011 | Lo et al. | 717/174 |
| 7,992,050 B2 * | 8/2011 | Melamed | 714/45 |
| 8,209,564 B2 * | 6/2012 | Vidal et al. | 714/38.1 |

(Continued)

OTHER PUBLICATIONS

Kolano, P., "A Unified Framework for Periodic, On-Demand, and User-Specified Software Information", Proceedings of trhe 5$^{th}$ IEEE/ACM Int'l Workshop on Grid Computing [online], 2004 [retrieved May 12, 2015], Retrieved from Internet: <URL: http://dl.acm.org/citation.cfm?id=1033255>, pp. 1-8.*

(Continued)

*Primary Examiner* — Todd Aguilera
(74) *Attorney, Agent, or Firm* — Lowenstein Sandler LLP (57) ABSTRACT

Embodiments relate to systems and methods for generating a machine state verification using a number of installed package objects. A physical or virtual client machine can host a set of installed software packages, including operating system, application, and/or other software. A package manager installed on the client machine can track the installed package complement, and updates available for those packages. To verify that a target of a package update is prepared and in the correct state to receive the update, the package manager inventory the set of package objects installed on the client machine. The resulting sum can be reported to a remote management platform, such as a package server. The counted package objects can be the packages themselves, and/or their set of component files. Machines having a package sum that does not match an expected target number can have a package re-installation performed, and/or other diagnostics carried out.

16 Claims, 5 Drawing Sheets

(56) References Cited

U.S. PATENT DOCUMENTS

| | | | |
|---|---|---|---|
| 8,429,256 B2 * | 4/2013 | Vidal et al. | 709/221 |
| 8,601,170 B1 * | 12/2013 | Marr et al. | 710/8 |
| 8,762,931 B2 * | 6/2014 | Vidal et al. | 717/101 |
| 2002/0083343 A1 | 6/2002 | Crosbie et al. | |
| 2002/0100036 A1 * | 7/2002 | Moshir et al. | 717/173 |
| 2002/0112232 A1 * | 8/2002 | Ream et al. | 717/176 |
| 2002/0174422 A1 * | 11/2002 | Kelley et al. | 717/178 |
| 2003/0159070 A1 | 8/2003 | Mayer et al. | |
| 2004/0181790 A1 * | 9/2004 | Herrick | 717/168 |
| 2004/0250167 A1 * | 12/2004 | Sato et al. | 714/38 |
| 2007/0233854 A1 * | 10/2007 | Bukovec et al. | 709/224 |
| 2008/0098387 A1 * | 4/2008 | Lo et al. | 717/174 |
| 2011/0214018 A1 * | 9/2011 | Vidal et al. | 714/25 |
| 2011/0214112 A1 * | 9/2011 | Vidal et al. | 717/168 |

OTHER PUBLICATIONS

Seth Kelby Vidal, "Systems and Methods for Tracking a History of Changes Associated with Software Packages and Configuration Management in a Computing System", U.S. Appl. No. 12/551,523, filed Aug. 31, 2009.

Seth Kelby Vidal, "Systems and Methods for Improved Identification and Analysis of Threats to a Computing System", U.S. Appl. No. 12/610,564, filed Nov. 2, 2009.

Seth Kelby Vidal, "Systems and Methods for Utilizing a History of Changes Associated with Software Packages and Configuration Management to Manage Multiple Computing Systems", U.S. Appl. No. 12/610,610, filed Nov. 2, 2009.

Seth Kelby Vidal, "Systems and Methods for Generating a Version Identifier for a Computing System Based on Software Packages Installed on the Computing System", U.S. Appl. No. 12/627,744, filed Nov. 30, 2009.

Seth Kelby Vidal, "Systems and Methods for Managing a Network of Computer System Using a Version identifier Generated Based on Software Packages Installed on the Computing Systems", U.S. Appl. No. 12/627,989, filed Nov. 30, 2009.

Seth Kelby Vidal, "Systems and Methods for Tracking a History of Changes Associated with Software Packages in a Computing System", U.S. Appl. No. 12/551,475, filed Aug. 31, 2009.

Seth Kelby Vidal, "Systems and Methods for Generating Encoded Identifications of Selected Subsets of Installed Software Packages on a Client Machine", U.S. Appl. No. 12/768,330, filed Apr. 27, 2010.

Seth Kelby Vidal, "Systems and Methods for Determining Compatibility of a Software Package Update Using a Version Identifier", U.S. Appl. No. 12/713,271, filed Feb. 26, 2010.

Seth Kelby Vidal, "Systems and Methods for Detecting Computing Processes Requiring Reinitialization After a Software Package Update", U.S. Appl. No. 12/714,178, filed Feb. 26, 2010.

* cited by examiner

| MACHINE ID | PACKAGE SUM | TARGET NUMBER OF INSTALLED PACKAGE OBJECTS | MACHINE STATE | PROCEED WITH PACKAGE UPDATE | PERFORM DIAGNOSTICS | |
|---|---|---|---|---|---|---|
| 0127 | PACKAGES = 119 | PACKAGES = 119 | COMPLIANT | YES; 00:11:30 | NO | |
| 0128 | FILES = 10,205 | FILES = 10,160 | FAULT | NO | YES | ⋮ |
| 0129 | PACKAGES = 208 | PACKAGES = 220 | FAULT | NO | YES | |
| ⋮ | | | | | | |
| 0255 | PACKAGES = 306 | PACKAGES = 306 | COMPLIANT | YES; 00:12:00 | NO | |

PACKAGE OBJECT RECORD

GENERATING MACHINE STATE VERIFICATION USING NUMBER OF INSTALLED PACKAGE OBJECTS

FIELD

The present teachings relate to systems and methods for generating a machine state verification using a number of installed package objects, and more particularly, to platforms and techniques for interrogating or retrieving a number of total package objects installed on one or more client machines, including packages themselves and/or component files of packages, comparing the package object sum to a target or expected number, and generating a machine state verification to indicate the readiness of those machines receive package updates, and/or to undergo other management or configuration activity, based on whether the package object sum matches or deviates from the target or expected total.

BACKGROUND OF RELATED ART

Users of physical or virtual machines commonly install software packages, including package updates, to those machines. The software packages can contain a set of related files chosen to perform a given application or task, such as, for example, a group of software applications, drivers, and/or other resources used to install and use messaging or media applications. In instances, a software package can contain application software, operating system software, drivers, patches, and/or other software components grouped as a logical set.

Software package managers exist to help a user initiate and perform software package updates, such as, for example, the "yum" (Yellowdog update manager) package update manager available from Red Hat, Inc., Raleigh, N.C., and others. In general, available software package managers are configured to interact with the set of installed packages on a client and with one or more software package repositories and associated package servers, to directly connect to those databases and download available package updates.

The process of initiating software package updates can involve, however, the risk or possibility of software-related faults, instabilities, bugs, or other errors or irregular conditions. Some of those potential faults or irregular conditions can be the result of a target machine that was not in the correct or expected machine state to receive a package update or updates. For instance, a client machine scheduled to receive a package update may not contain the correct version, or correct number, of previous packages needed to support that update. Irregularities in the package complement can in one regard be caused, for example, by users in the managed network performing unauthorized package updates to client machines, resulting in an unexpected total package sum on those machines. The client machine in addition or instead might be missing one or more component files that are necessary to the operation of the existing package complement. Missing files from a package complement can for instance can be due to further causes hard drive corruption, malicious software intrusions, or other issues. Beyond issues of that nature, an administrator in a managed network may also not have an up-to-date or complete inventory of the machines on the network that represent identical images of desired configurations, and therefore be ready to receive a collective package update, or other collective maintenance.

Existing package update managers may contain facilities to interrogate the state of client machines in a network, but typically need to extract package name, version, and/or other attributes from client machines to attempt to identify the installed package complements on managed machines and reconcile package sets, group related machines together, and/or perform other package-related maintenance and administration. It may be desirable to provide systems and methods for generating a machine state verification using a number of installed package objects, in which a package server or other management platform can interrogate client machines using a comparatively lightweight census or reporting mechanism, but which is nevertheless sensitive to changes in target machine state.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating a machine state verification using a number of installed package objects. More particularly, embodiments related to platforms and techniques for capturing a package sum representing the total number of packages, and/or constituent files of those packages, installed on one or more clients in a managed network. A package server and/or other remote management platform can verify the value of the package sum against a target number of installed packages, to determine whether the one or more clients acting as a target for package updates or other management activity is in the correct or expected machine state with the expected number and/or types of package complement. In aspects, a local package manager can track and manage the installation of one or more software packages and/or updates to those packages (which may be referred to together as a "software package update") on those client machines, and/or other host, target, and/or other machines acting as recipient of package updates. These and other embodiments described herein address the various noted shortcomings in known package update technology, and provide a user with enhanced package and system management capability for taking an inventory of, updating, and managing their software package resources with less potential for installation conflicts, errors, or other undesirable results of updating activity, as well as providing an ability to perform additional management and configuration functions with enhanced package tracking capabilities.

Reference will now be made in detail to exemplary embodiments of the present teachings, which are illustrated in the accompanying drawings. Where possible the same reference numbers will be used throughout the drawings to refer to the same or like parts.

Figure 1:
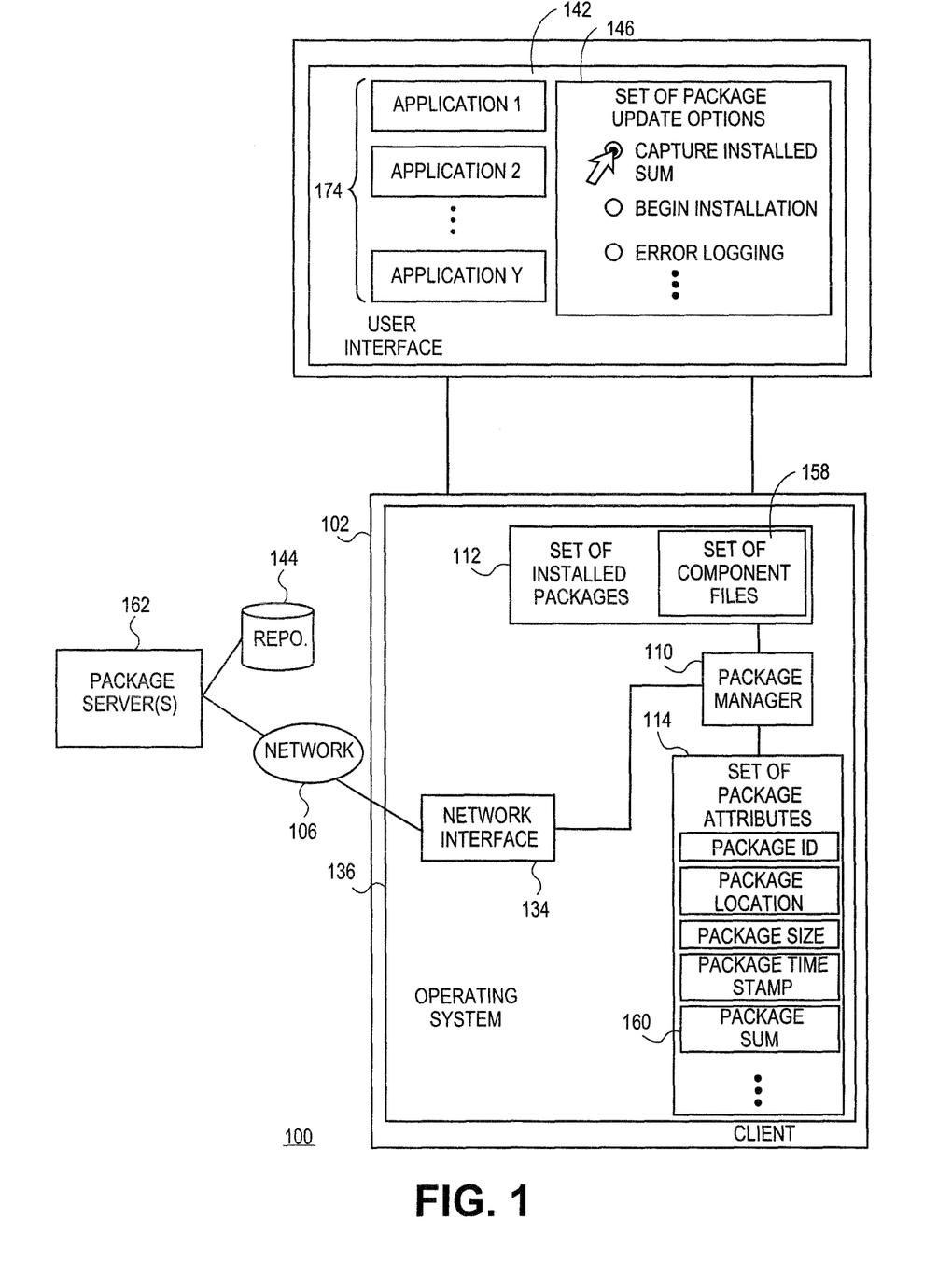
FIG. 1 illustrates an overall network in which systems and methods for generating a machine state verification using a number of installed package objects can be implemented, according to various embodiments.

FIG. 1 illustrates an exemplary managed network 100 in which systems and methods for generating a machine state verification using a number of installed package objects can be implemented, according to various embodiments. In embodiments as shown, in the managed network 100 one or more clients 102 can store, execute, and otherwise host a variety of resources including a package manager 110 configured to communicate with a set of installed packages 112, a set of applications 174, and other hardware, software, and resources. In embodiments, the package manager 110 can be or include a software application, a utility, or an application programming interface (API) to an operating system 136 of one or more clients 102, a service, and/or other local or remote logic or resources. According to embodiments, the package manager 110 can access and manage the set of installed packages 112 to run, edit, update, configure, and otherwise manage one or more software packages hosted or installed in the one or more clients 102. In aspects, the package manager 110 can be or include one or more commercially and/or publicly available package manager applications or resources, such as the "yum" package manager available from Red Hat, Inc., Raleigh, N.C., based on or compatible with the Red Hat package manager (rpm) platform also available from Red Hat, Inc., or others.

In aspects, the set of installed packages 112 can contain executable files for, or otherwise support or be associated with, the set of applications 174 installed on one or more clients 102. In aspects, the set of applications 174 can be or include types of applications or other software, such as, for example, messaging applications, media application, database applications, spreadsheet or modeling applications, social networking applications, word processing applications, and/or other applications or utilities. In aspects, the set of installed packages 112 can contain any one or more of the set of applications 174, and can in aspects also include the operating system 136, drivers, and/or related components also installed on the one or more clients 102. The set of installed packages 112, and/or the set of component files 158 of those packages, can each have an associated set of package attributes 114 which record or reflect the file names, versions, dates, epochs, storage sizes, software requirements, an/or other attributes related to those of software packages, including their updates, installed on the one or more clients 102.

In aspects, the package manager 110 can communicate with a network interface 134, such as an Ethernet™ or other network port, configured to connect to one or more networks 106, such as the public Internet or other public or private networks. The package manager 110 can thereby connect to a remote set of one or more package servers 162 and associated one or more package repositories 144. The one or more package servers 162 and associated one or more package repositories can host a set of software packages for distribution and installed in the managed network 100, including original application package installations, original operating system installations, operating system and/or application package updates, and/or other software or resources related to packages and their associated resources.

In aspects, the package manager 110 can interact with the set of installed packages 112, along with the one or more package servers 162 and associated one or more package repositories 144 to inspect, inventory, configure, test, update, and/or otherwise manage the set of installed packages 112 operating on the one or more clients 102. The package manager 110 can, for example, provide a user with a set of package update options 146 displayed via user interface 142, such as a graphical user interface or others, to select various test, configuration, and/or other management activities on the locally hosted set of installed packages 112. The set of package update options 146 can include options such as one or more selections for inventorying, installing and/or updating, selecting storage options, and/or selecting other options or parameters for the downloading of package updates from the one or more package servers 162 and associated one or more package repositories 144, to add to or update the set of installed packages 112.

In aspects, the package manager 110 can access the set of installed packages 112, and/or the set of component files 158 of those packages, to determine and capture a package sum 160. In aspects, the package sum 160 can represent a total number of the package objects contained in the set of installed packages 112, such as a total number of actual packages reflected in that set. In aspects, the package sum 160 can in addition or instead represent the total number of files in the set of component files 158 contained in the set of installed packages 112. In aspects, the package sum 160 can contain more than one field or component, such as for instance both the total number of packages and the total number of files in those packages. For example, for a given machine, the package manager 110 can inventory the set of installed packages 112 on the one or more clients 102 and determine that 46 packages are locally installed on that machine, and that those 46 packages together contain 14,340 files for that subject machine. The package manager 110 of the one or more clients 102 can then report data including "packages=46", "files=14,340", and/or "packages=46; files=14,340" as part or all of the information captured and encoded in the package sum 160. Other data, fields, formats, or information can be captured and encoded in the package sum 160. For instance, in aspects, the total number of directories, libraries, and/or other file or storage structures associated with the set of installed packages 112 can be incorporated in the package sum 160. Other attributes or data can be encoded in the package sum 160.

Figure 2:
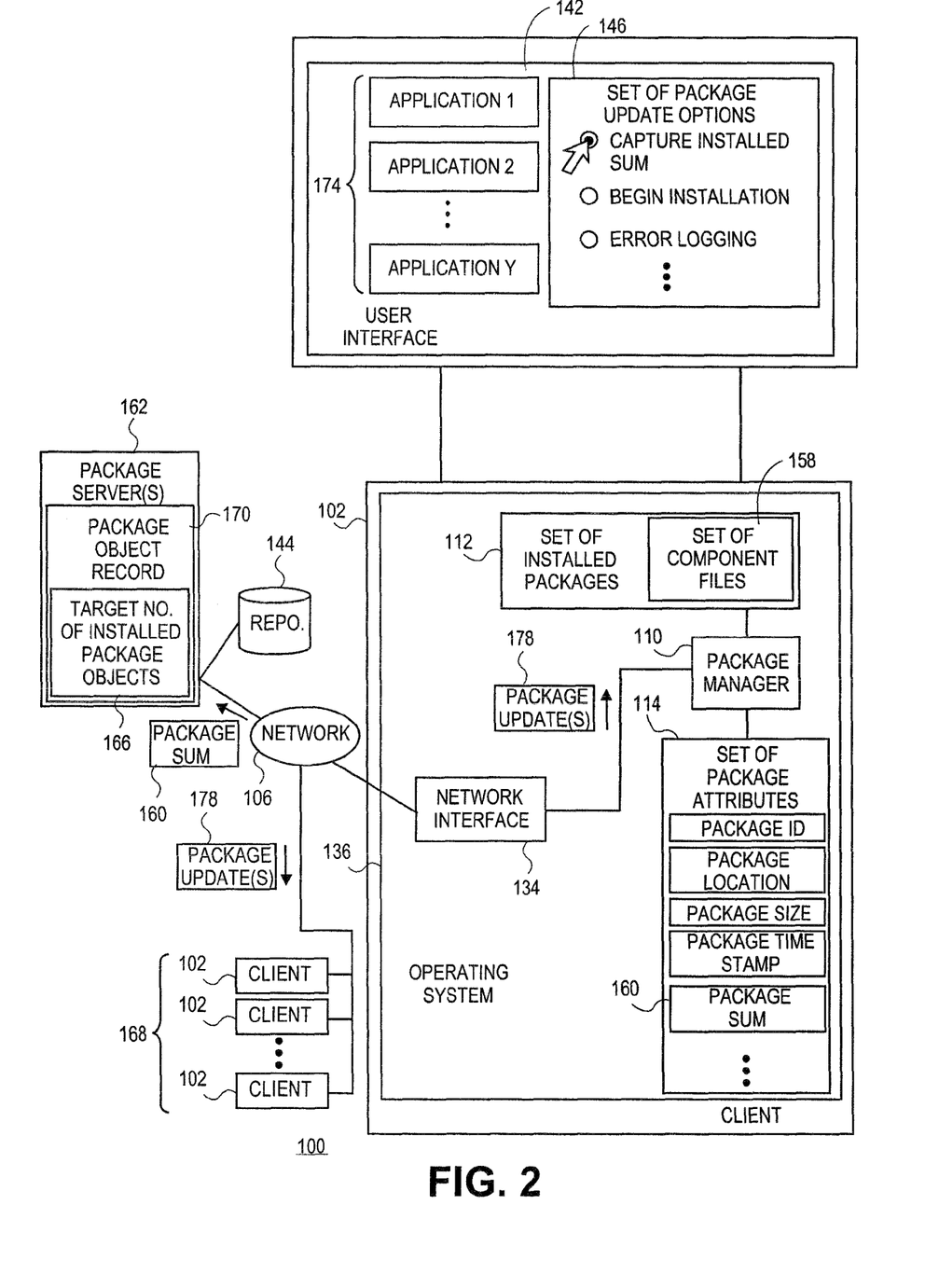
FIG. 2 illustrates an overall network in which for systems and methods for generating a machine state verification using a number of installed package objects can be implemented, according to various embodiments in further regards.

As illustrated for example more particularly in FIG. 2, package manager 110 on one or more clients 102 can connect to the one or more package servers 162 and associated one or more package repositories 144 via one or more network 106. The package manager 110 on one or more clients 102 can transmit the captured package sum 160 data to the one or more package servers 162 and associated one or more repositories 144 via the one or more networks 106. It may be noted that the capturing and reporting of the package sum 160 from the one or more clients 102 or other machines can be initiated at different times, and/or using different triggers. For example, the package sum 160 can be captured by the package manager 110 of one or more clients 102 at times selected or generated by the package manager 110, itself. For instance, the package manager 110 of one or more clients 102 can capture and report the package sum 160 on a periodic basis, such as once a day, week, month, and/or other period. In aspects, the package manager 110 of the one or more clients 102 or other machines can capture the package sum 160 on an event-triggered or other non-periodic basis, such as based on an end-user selection or request. Conversely, in embodiments, rather than being pushed from the one or more clients 102, the delivery of package sum 160 to the one or more package servers 162 can be initiated on a pull basis, such as by a command issued by an administrator operating the one or more package servers 162, and/or by automatic or periodic commands initiated by the one or more package servers 162 or other remote management platforms. In embodiments, the capture and reporting of the package sum 160 from the one or more clients 102 and/or other machines can also be triggered or initiated at other times, and/or based on other conditions.

In aspects as shown in FIG. 2, some or all of the client machines in the set of one or more clients 102 can, in embodiments, be arranged, configured, or grouped as a set of targets 168. In aspects, the one or more clients 102 which may be grouped as set of targets 168 can be configured to perform package operations on a collective basis, including to extract information such as the package sum 160, and to receive one or more package updates 178 and/or other installations, configuration commands, and/or other data.

In aspects, the one or more one or more package servers 162 communicating with the set of targets 168 and/or the one or more clients 102 can maintain a package object record 170 encoding the package sum 160, a data record representing a target number of package objects 166 expected or required for each machine, and/or other information to identify and analyze the state of any one or more machines in managed network 100. In aspects, the one or more package servers 162 can determine by inspection of the package object record 170 whether any one or more machines in one or more clients 102, the set of targets 168, and/or other machine or machines contains or currently hosts the correct, expected, compliant, or otherwise functionally appropriate number of packages in set of installed packages 112, and/or hosts the correct number of constituent files in set of component files 158. In aspects, the one or more package servers 162 communicating with the package manager 110 of any one or more clients 102 and/or the set of targets 168 and/or other machines can determine that the subject machine or machines are in a compliant state when package sum 160 for that machine equals or matches the target number of installed package objects 166 for that machine or machines. Upon verifying that the subject machine(s) are in compliant state or otherwise acceptable state, the one or more package servers 162 can initiate package update activities, such as transmitting one or more package updates 178 to those identified machines.

In aspects, the one or more package servers 162 can perform other network management operations in the one or more clients 102, the set of targets 168, and/or other machines, based on the verification of those client or target machine states. For instance, in aspects, the administrator or other user of the managed network 100 may wish to inventory and identify all client machines having a precisely equal package sum 160. This may permit, for instance, the identification and/or grouping of identical machine images containing an identical set of package and/or file images, since the likelihood of any two machines randomly containing the same number of packages and/or files without representing the same instance or image of a machine, whether physical or virtual, is low. The one or more package servers 162 can thereby perform a discovery process on the managed network 100, and can in embodiments locate the one or more clients 102 to group or configure into the set of targets 168 or other arrangement, for instance to define a class of clients or workstations grouped for a specific engineering, financial, and/or other technical or other project, task, or user group.

Conversely, in cases where the package sum 160 derived for a given one or more clients 102 or other machines does not match or equal the target number of installed package objects 166 for that machine or machines, the one or more package servers 162 can perform further management operations on that machine or machines. For instance, the one or more package servers 162 and/or other remote management platforms can execute diagnostic or debugging routines, examine event logs or other usage history or machine state data, and/or perform other diagnostic or corrective actions on those non-compliant machines. In aspects, non-compliant machines in the one or more clients 102 and/or set of targets 168 can be interrogated or inventoried, for instance to examine the machine history and identify potential causes of an incorrect or non-compliant package sum 160. Those causes or potential causes can include events such as unauthorized package updates, security breaches, intrusions by viruses or other malicious software, and/or other events what may have resulted in the set of installed packages 112, the set of component files 158, and/or other resources deviating from the desired complement and package sum 160, and thereby producing a package sum 160 which differs from the target number of installed package updates 166. Other variables, factors, histories, and/or data can be analyzed in determining the machine state of one or more clients 102, the set of targets 168, and/or other machines identified as being in a non-compliant state.

Figure 3:
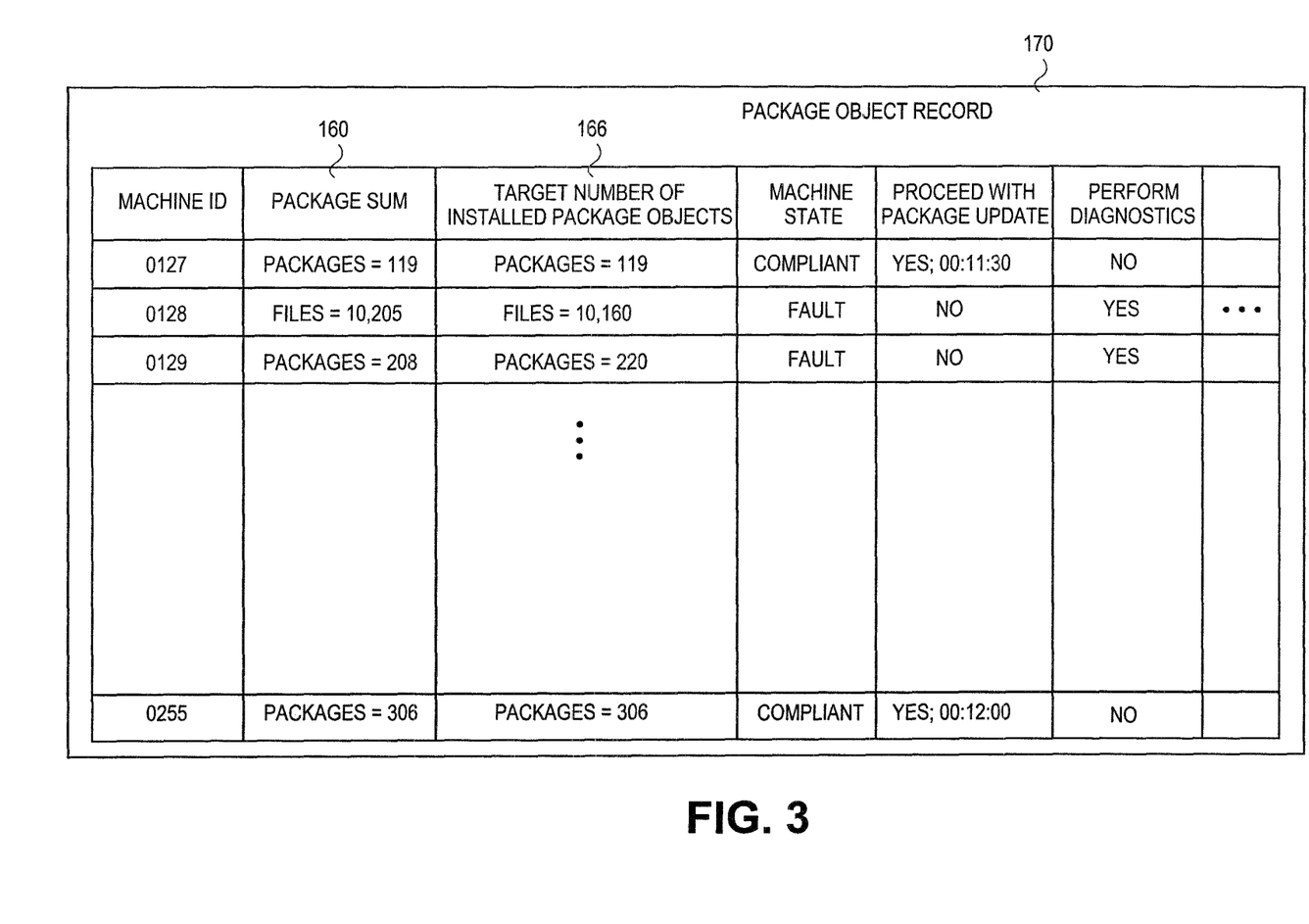
FIG. 3 illustrates an exemplary data structure, for a package object record that can be used to store data related to package installations on one or more clients, according to various embodiments.

FIG. 3 illustrates an exemplary data storage structure for the package object record 170 that can for instance be stored by the one or more package servers 162, for instance in the one or more package repositories 144 and/or other local or remote storage. In aspects as shown, the package object record 170 can encode and store information that can be keyed on a field identifying one or more clients 102 by a machine ID, such as a serial number media access control (MAC) address, and/or other address or identifier. In aspects, the package object record 170 can store the package sum 160 received from each individual machine in one or more clients 102 and/or other machines, which value can represent the total number of packages, and/or the set of component files 158 contained with those packages, on the subject machine. The package object record 170 can likewise store the target number of installed package objects 166 for each subject machine, reflecting the expected or correct number of packages/files that should be reflected as installed on each machine. In aspects, the target number of installed package objects 166 can be generated or obtained by the one or more packager servers 162 and/or other logic, for instance by examining the installation history, current package complement, and/or other data for a client machine in the one or more repositories 144. In embodiments, data or records from other sources can be used to determine the target number of installed package objects 166, such as, for example, a configuration file or template for the one or more clients 102 that can be used during an original installation or provisioning process.

In addition to fields reflecting the package sum 160 and the target number of installed package objects 166, package object record 170 can likewise store other information related to the package complement and machine state for the one or more clients 102, including, for instance, an indication whether each client in the one or more clients 102 is in a compliant or expected state. In aspects, a machine can be identified to be in a compliant or expected state when the package sum 160 equals or matches the target number of installed package objects 166, indicating that all packages and/or files that should be installed on a client machine are in fact installed and present on that machine. In cases where the package sum 160 and target number of installed package objects 166 do not equal or match, the record for that machine can be flagged to reflect a fault state or other non-compliant or unexpected state. In embodiments, the package object record 170 can also contain a field or fields (as shown) indicating whether a package update operation should proceed on a given client machine, and if so, when that update process is scheduled to take place. Fields can also be incorporated in package object record 170 to indicate whether diagnostic actions should be performed, as when, for instance, the machine state is found to be non-compliant, and a package inventory or other diagnostic check or routine needs to be run on that machine to identify the cause of the incorrect package sum. Other data, fields, identifiers, attributes, commands, and/or other information can be encoded in the package object record 170.

Figure 4:
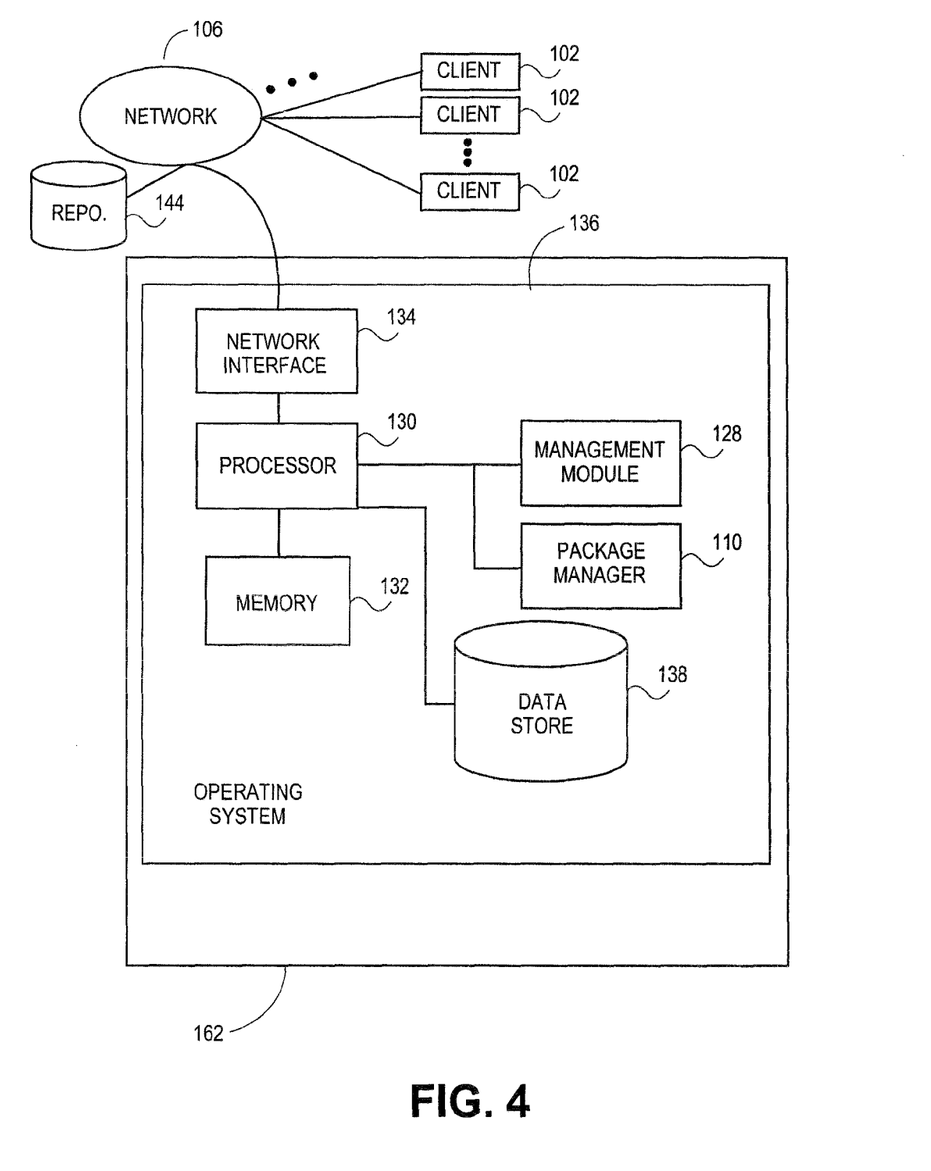
FIG. 4 illustrates exemplary hardware and other resources of a package server machine that can be used in systems and methods generating a machine state verification using a number of installed package objects, according to various embodiments.

FIG. 4 illustrates an exemplary diagram of hardware and other resources that can be incorporated in one or more package servers 162 to manage, analyze, test and configure a set of installed packages 112 and other resources on the one or more clients 102, according to embodiments. In embodiments as shown, the one or more package servers 162 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. The processor 130 also communicates with a management module 128 which can comprise applications, software, and/or logic to perform package management activity, as well as a data store 138, such as a database stored on a local hard drive. The processor 130 further can communicate with a network interface 134, such as an Ethernet or wireless data connection, which in turn communicates with one or more networks 106, such as the Internet or other public or private networks. The processor 130 also communicates with one or more clients 102 via network interface 134 and one or more networks 106, including the package manager 110 hosted on each machine of one or more clients 102, and/or other resources to execute control logic and control the inventorying, updating, installation, analysis and management of software packages on those machines and their associated processes. Other configurations of the one or more packager servers 162, including processor and memory resources, associated network connections, and other hardware and software resources are possible. It may be noted that in embodiments, each of the one or more clients 102 can contain the same or similar hardware, software, communications, and/or other resources as one or more package servers 162, and/or can be differently configured from those machines.

Figure 5:
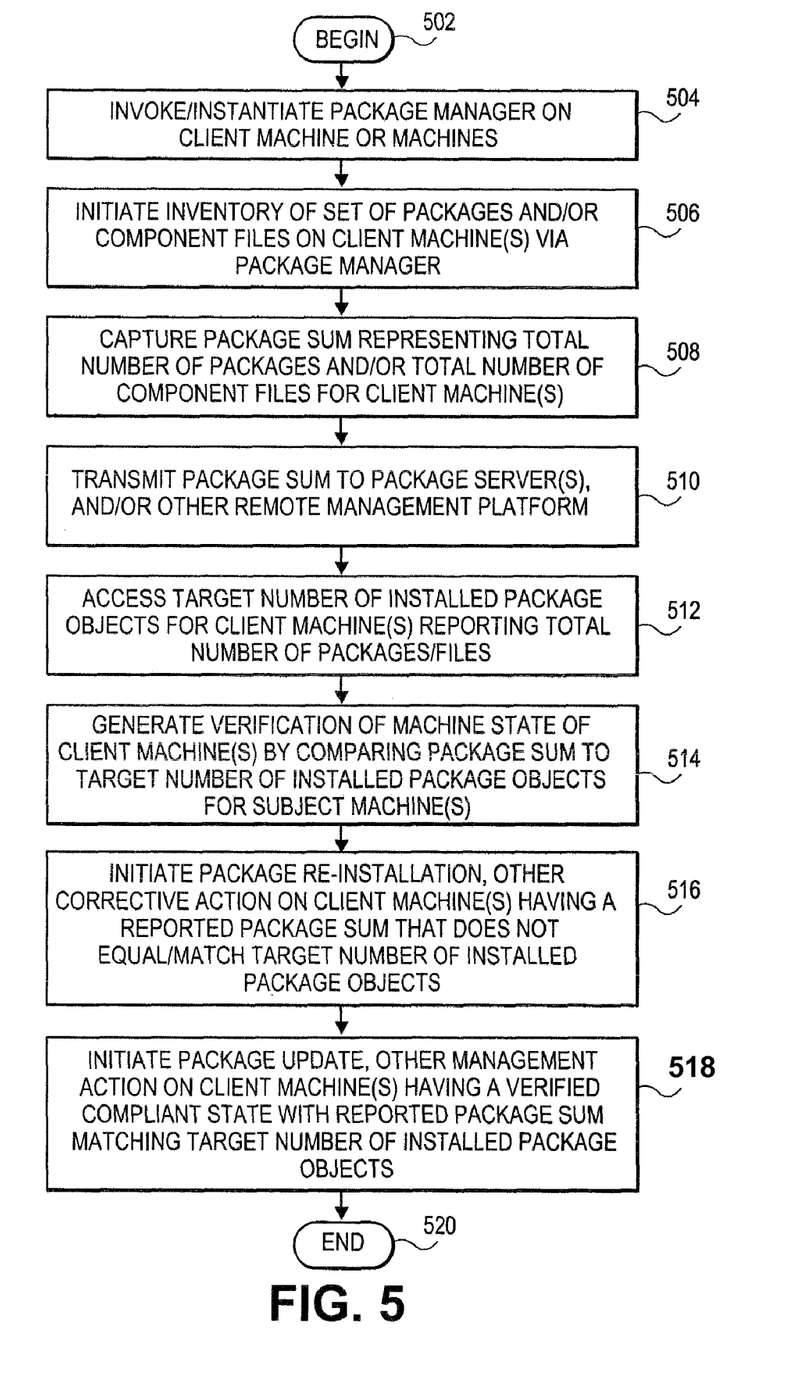
FIG. 5 illustrates a flowchart of package inventorying, analysis, and other processing that can be used in systems and methods for generating a machine state verification using a number of installed package objects, according to various embodiments.

FIG. 5 illustrates overall processing to track, monitor, and manage inventories of software packages, component files of those packages, and other data in connection with verifying the machine state of one or more clients 102 in a managed network 100, according to various embodiments. In 502, processing can begin. In 504, a user can invoke or instantiate the package manager 110 on one or more clients 102 to perform inventory, maintenance, updating, testing, and other activity. In 506, the inventory processing of the set of installed software packages 112, the set of component files 158 of those packages, and/or other files, attributes, or objects hosted on one or more clients 102 can be initiated. In aspects, the inventory and related processing can be initiated by a user of one or more clients 102 via the package manager 110 itself, and/or by or through other logic. In aspects, the inventory and related processing can be initiated automatically by an application or service, for instance, by a service communicating with one or more clients 102 to perform an inventory of the total package/file complements on those machines on a periodic, event-triggered, and/or other basis. In aspects, automatic inventories or package census checks can be run on the set of installed software packages 112, the set of component files 158, and/or other data or objects of the one or more clients 102 in connection with package update activities, and/or can be performed independently of package update activities.

In 508, the package manager 110 on one or more clients 102 can identify and capture the total number of package objects 160 present in set of installed software packages 112 hosted in one or more clients 102. In aspects, as noted, the package sum 160 can be or include a total number of the packages in set of installed packages 112, such as, for example, 10, 150, 100, 2,000, or other total numbers of packages installed in the subject machine or machines in the one or more clients 102. In aspects, the package sum 160 can in addition or instead be or include a total number of files present in the set of component files 158, such as, for example, 100, 1,000, 15,000, or other total numbers of files contained in the set of installed packages 112 of the subject machine or machines. In aspects, the package manager 110 can generate or extract the package sum 160 and/or related data, for instance, by invoking or calling an application programming interface (API) of operating system 136 of the one or more clients 102, to enumerate the set of installed software packages 112, the set of component files 158, and/or related resources, and generate the package sum 160 including a total number of those packages, files, and/or other objects. In aspects, other objects encoded in the package sum 160 can include storage structures such as the number of directories, libraries, and/or other resources. In 510, the package manager 110 and/or other logic can transmit the package sum 160 to the one or more package servers 162 and/or other remote management platform or site.

In 512, the one or more package servers 162 can access a target number of installed package objects 166 for each client machine or machines reporting a total number of package objects 160. In aspects, the target number of installed package objects 166 can be or include the total number of packages, and/or the total number of component files for those packages, that the one or more package servers 162 and/or other management platform(s) has on record as the desired or correct number of packages/files that should be installed on one or more clients 102. In aspects, the target number of installed package objects 166 can be stored in the one or more package servers 162, in the associated one or more repositories 144, and/or in other local or remote storage maintained by or accessible to the one or more package servers 162. In aspects, the target number of installed package objects 164 can be determined from records of package updates performed on the one or more clients 102 by the one or more package servers 162, and/or other records or logic.

In 514, the one or more package servers 162 and/or other logic can generate a determination or verification of the machine state of the one or more clients 102 by comparing the package sum 160 as reported by that machine or machines to the target number of installed package objects 166. In cases where the package sum 160 matches or equals the target number of installed package objects 164, the one or more package servers 162 and/or other logic can verify or determine that the one or more clients 102 are in a compliant state, having a correct package complement whose package sum 160 equals the number of installed package objects 166, and/or is otherwise configured in a correct or appropriate fashion. In cases where the package sum 160 does not match or equal the target number of installed package objects 166, the one or more package servers 162 and/or other logic can verify or determine that the one or more clients 102 are in a non-compliant or other irregular state. In embodiments, the one or more package servers 162 can flag or record the identity of all those machines in the one or more clients 102 whose package sum 160 does not match or equal the expected target number of installed package objects 166. In aspects, a mismatch between the target number of installed package objects 166 and the package sum 160 can be caused by a variety of causes, including, for example, intervening downloads or installations of software packages, which may for instance be done by a user on an unauthorized basis. Other causes of a mismatch between the package sum 160 and the target number of installed package objects 166 can include machine crashes, hard drive or other storage corruption, and/or viruses or other malicious software.

In 516, the one or more package servers 162 and/or other logic can initiation package re-installation and/or other corrective or responsive action the on one or more clients 102 having a reported package sum 160 that does not match or equal the target number of installed package objects 166. For instance, the one or more package servers 162 can also or instead interrogate the machines in one or more machines 102 whose package verification failed or was non-compliant, to initiate remote diagnostic routines on that machine or machines. In 518, the one or more package servers 162 can initiate a package update process, and/or other management action(s) on those machines in the one or more clients 102 having a verified compliant state, with the reported package sum 160 matching or equaling target number of installed package objects 166. For instance, the one or more package servers 162 can identify all machines in managed network 100 being in a compliant state or otherwise appropriate configuration with respect to their package complement and all constituent installed files, and group those machines together in a set of targets 168 for a group update, or perform other actions on those identified client or other machines. In 520, as understood by persons skilled in the art, processing can return to a prior processing point, jump to a further processing point, or end.

The foregoing description is illustrative, and variations in configuration and implementation may occur to persons skilled in the art. For example, while embodiments have been described in which a unitary package manager 110 locally installed on each machine in the one or more clients 102 is configured to control package update activity, in embodiments, multiple applications or software can interact to control the downloading, installation, testing, and other management of software packages. For further example, while embodiments have been described in which package update activity is conducted on one client of one or more clients 102, in embodiments, multiple local or remote targets, clients, and/or other machines can register to one package manager 110 and/or other logic or resources to receive or perform package inventory, update, and/or management activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
  receiving, by a processor distinct from a host machine, a package sum, wherein the package sum is a data record comprising a first field with a first value representing a total number of packages installed on the host machine and a second field with a second value representing a total number of component files contained in the packages installed on the host machine;
  comparing, by the processor, the first value of the package sum to a target number of packages;
  comparing, by the processor, the second value of the package sum to a target number of component files; and
  generating, by the processor, a machine state verification of the host machine in view of the comparisons, wherein the machine state verification is successful only when the first value of the package sum equals the target number of packages and the second value of the package sum equals the target number of component files.

2. The method of claim 1, wherein the package sum is captured by a package manager installed on the host machine.

3. The method of claim 1, wherein the generating is prior to an initiation of a package update process on the host machine.

4. The method of claim 1, wherein the generating is after completion of a package update process on the host machine.

5. The method of claim 4, further comprising
  initiating an inventory process on the host machine to identify at least one incorrectly installed component file.

6. The method of claim 5, further comprising initiating a re-installation of the at least one incorrectly installed component file.

7. The method of claim 1, wherein the host machine is in a network comprising a plurality of host machines.

8. The method of claim 7, wherein the plurality of host machines hosts a virtual machine.

9. The method of claim 7, wherein the network comprises a cloud-based network.

10. The method of claim 7, further comprising identifying a subset of the plurality of host machines having a matching total number of installed component files.

11. The method of claim 10, further comprising initiating a package update process on the subset of the plurality of host machines.

12. A system comprising:
  a network interface to a host machine; and
  a processor, distinct from the host machine and operatively coupled to the network interface, to:
    receive, via the network interface, a package sum, wherein the package sum is a data record comprising a first field with a first value representing a total number of packages installed on the host machine and a second field with a second value representing a total number of packages installed on the host machine,
    compare the first value of the package sum to a target number of packages,
    compare the second value of the package sum to a target number of components files contained in the packages installed on the host machine, and
    generate a machine state verification of the host machine in view of the comparisons, wherein the machine state verification is successful only when the first value of the package sum equals the target number of packages and the second value of the package sum equals the target number of component files.

13. The system of claim 12, wherein the package sum is captured by a package manager installed on the host machine.

14. The system of claim 12, wherein the host machine is in a network comprising a plurality of host machines.

15. The system of claim 14, wherein the plurality of host machines hosts a virtual machine.

16. The system of claim 14, wherein the processor is further to initiate a package update process on a subset of the plurality of host machines having a matching total number of installed packages.

* * * * *